Inventors
Henry F. Stemke
William W. Morris
By- Pendleton, Neuman,
Seibold & Williams
Attorneys

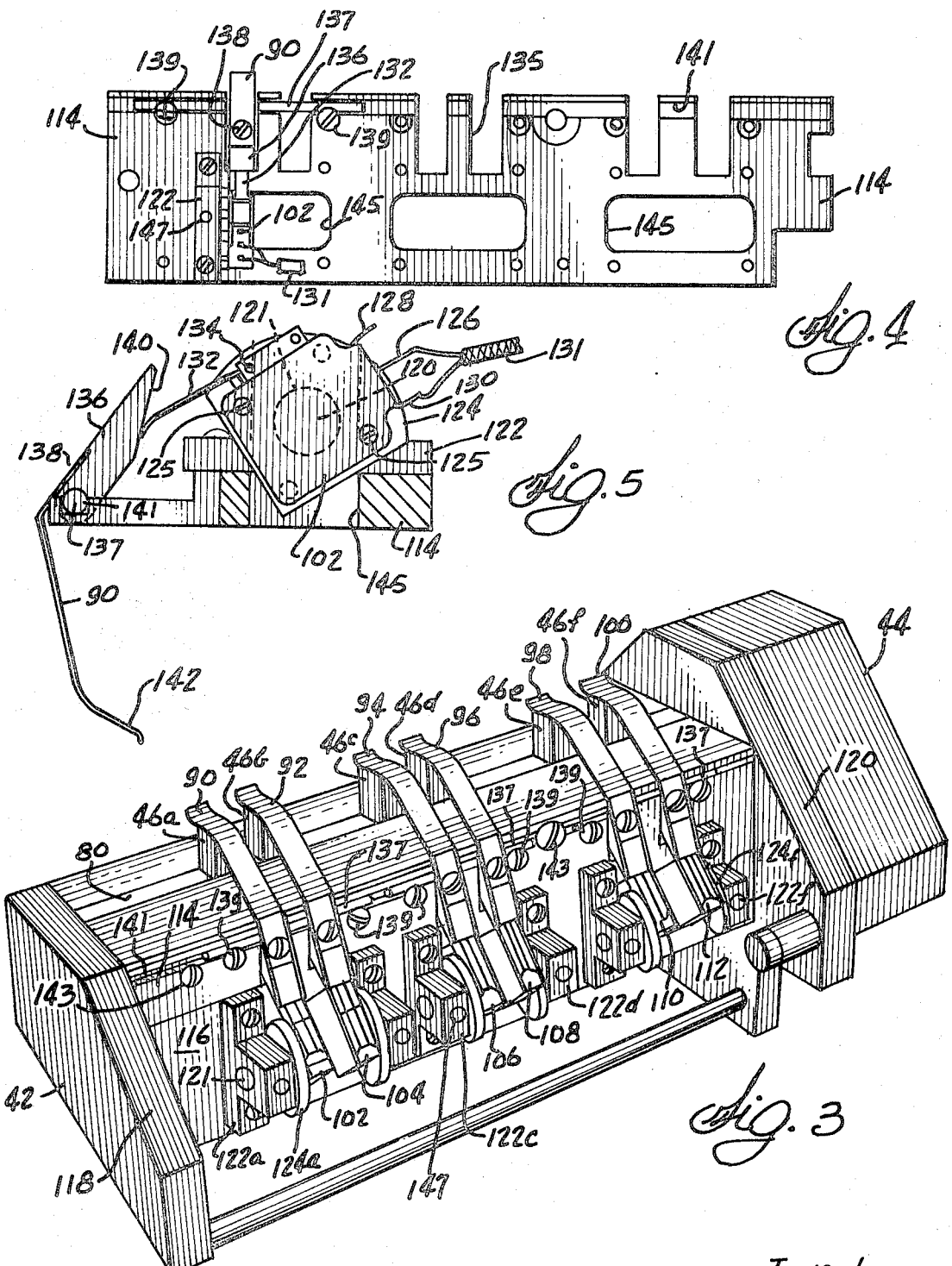

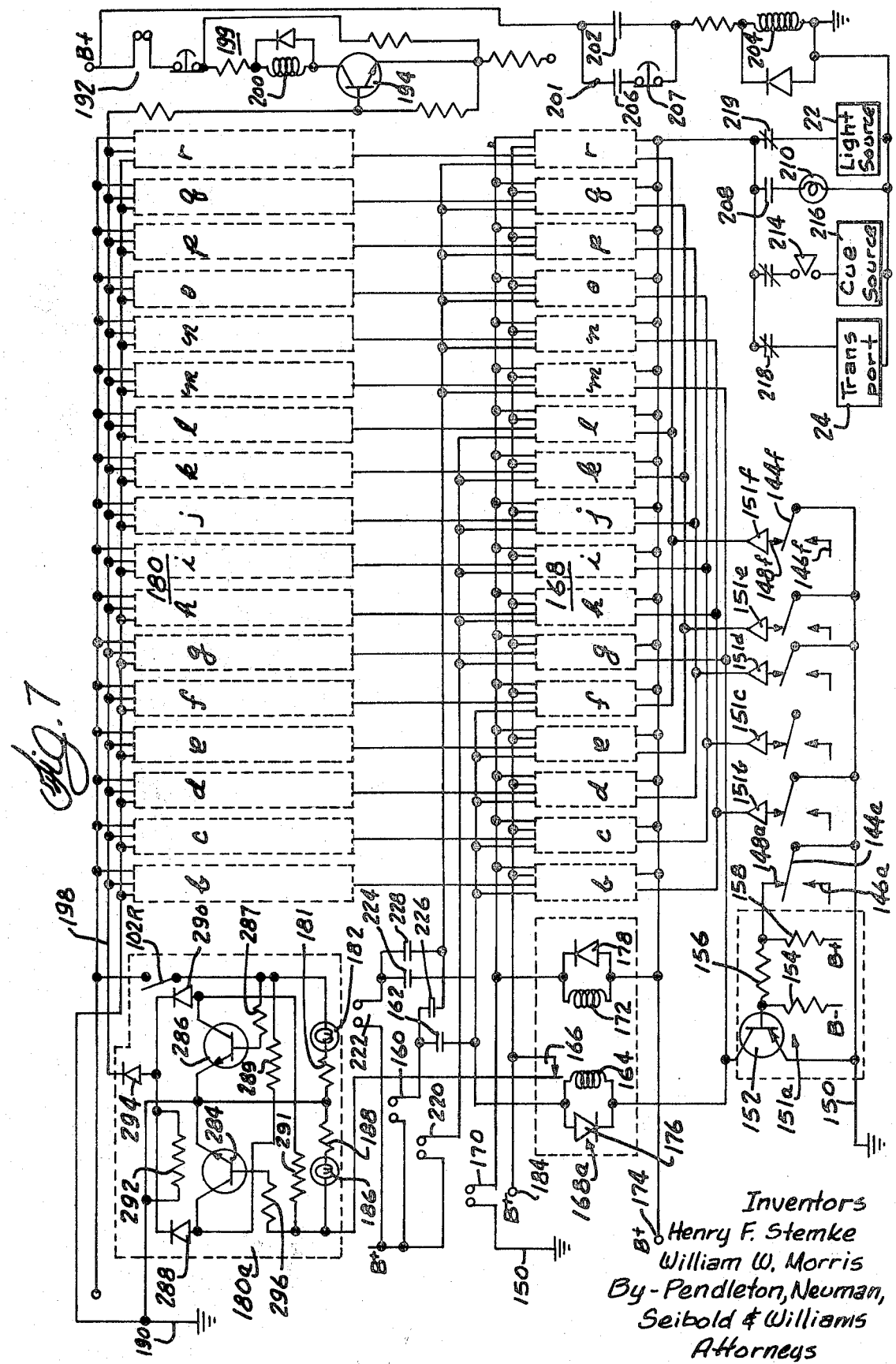

United States Patent Office 3,552,852
Patented Jan. 5, 1971

3,552,852
FILM COPYING APPARATUS
Henry F. Stemke, Morton Grove, and William W. Morris, Skokie, Ill., assignors to Peterson Enterprises, Incorporated, Glenview, Ill., a corporation of Illinois
Filed Aug. 19, 1968, Ser. No. 753,652
Int. Cl. G03b 27/76
U.S. Cl. 355—35
13 Claims

ABSTRACT OF THE DISCLOSURE

Improved film copying apparatus including protective systems which, in the preferred embodiment, check each light valve for each light change against the predetermined program and automatically stop the equipment and ignore subsequent information whenever an operational anomaly is observed.

---

This invention relates to improved film copying apparatus and more particularly to a system for continuously and automatically monitoring the operation of film copying equipment, for detecting any anomalies in the film copying equipment, for detecting any anomalies in the film copying operation and light modulation, and for automatically stopping the equipment and preserving the anomaly for service purposes.

This invention relates to improvements in equipment which is fully described and illustrated in the earlier filed application of William W. Morris and Henry F. Stemke entitled Bi-directional Film Printing Apparatus, Ser. No. 660,354, now Pat. No. 3,458,256, filed Aug. 14, 1967, and assigned to the same assignee as the instant application, hereinafter referred to as the Printer Application.

In the Printer Application the history of motion picture copying is described, particularly with reference to the alteration or modulation of a light source, either in intensity or color composition to reproduce the film with the same, or perhaps even improved, film density and color characteristics. In the early equipment, changes in the light source were made manually to adjust the exposure, and this was slow and inaccurate. Subsequently, various techniques were developed to automatically change the light projected into the film in accordance with a predetermined program usually sequentially recorded in some form.

In the equipment described in the Printer Application, the predetermined program is in the form of a punched tape. The tape has eight parallel columns of holes, or channels, extending longitudinally of the tape, and six of these represent the amount of light called for by the program at any particular point along the film. The six channels are generally in a binary coded system in which the respective channels represent 1, 2, 4, 8, 16, and 20 units of light with the system providing fifty-one possibilities. The holes are arranged in transverse rows, each containing up to eight possible holes, and the rows are grouped in sets of four in the color film printer. The four rows represent a space or rest position and red, green, and blue information.

An error in the transfer of first channel data from the tape to the valves would make only a slight difference in the light, while an error in the sixth channel would result in a severe discrepancy in the illumination. If the error is in only one light value, a color change results, while an error in all three produces a density change. In general, such errors render the film unfit for use and require the replacement of at least a substantial length of the film.

There are many possible causes for an anomaly between the light conditions called for by the punched tape and the actual light provided by the printing apparatus. In the apparatus described in the Printer Application, three light valves are utilized to control the amounts of red, blue, and green light which are combined to form a controlled light source. Each of these light values has a plurality of plungers having cam surfaces of different thicknesses which are mechanically related to the binary code to provide an additive output which is directly related to the plunger actuation. A clutch is provided to transfer the plunger position to the light value vane position at a predetermined time. A punched tape reader goes through a four-step cycle for each scene change or other change in the light composition, and in the three of these steps, the color information for red, blue, and green light is successively sensed and fed into the plungers which constitute a memory.

The original film and raw stock together pass a film aperture where the light impinges upon the raw film through the original. Cue effects, such as notches, are disposed on the original to indicate the point where a change in the light source is desired. When a cue effect is sensed, it causes a transfer of the color information from the plunger memory to the actual valve vanes which form the aperture in the light valve, and new data is then stored in the plungers.

It is one principal object of this invention to provide means for detecting any anomaly between the light conditions called for by the program information source and the actual light conditions stored in the plunger memory of the light valve. Such anomalies can result from defective switches, relays, contacts or electrical components or wiring or from mechanical malfunctions and may be quite intermittent in character.

It is a further object of this invention to provide an improved film printing system which will automatically program the light composition in accordance with a prepared information sequence and which includes means to detect an anomaly between the light composition and the information and perform certain auxiliary functions in response to such an anomaly.

It is still another object of the invention to provide a comparator system for the light program in a film printer wherein an anomaly detected by the comparator will stop the printing apparatus and preserve the anomaly for service purposes.

It is still another object of the invention to provide a comparator system which will function bi-directionally in a multicolor printing system.

Further and additional objects of the invention will become manifest from this description, the accompanying drawings, and the appended claims.

In one form of the invention, a punched tape reader is employed utilizing both normally open and normally closed contacts sensing the information in each channel. While one of these contacts is utilized for light valve control, the other is employed for anomaly checking. The information sensed by the primary contacts is appropriately processed and then utilized to control the plungers and ultimately the vanes in a light valve mechanism. Switches are actuated by the plungers and are used in a comparator with the other contacts in the tape reader for anomaly checking. A visual display is utilized to indicate, in side-by-side relationship, the condition of each of the six plungers and each of the reader contacts in each of the three colors so that any discrepancy may be readily detected. Furthermore, in the event of an anomaly, the equipment is automatically stopped and the cuing circuit opened to preserve the anomaly.

For a more complete understanding of the invention, reference will now be made to the accompanying drawings wherein:

FIG. 3 is a perspective view of the light valve of FIG. 2;

FIG. 4 is a plan view of a sensing switch subassembly which forms a portion of the light valve of FIG. 3;

FIG. 5 is an end view of the sensing switch portion shown in FIG. 4;

FIG. 7 is a schematic circuit diagram of the anomaly checking portion of the described apparatus.

Figure 1:
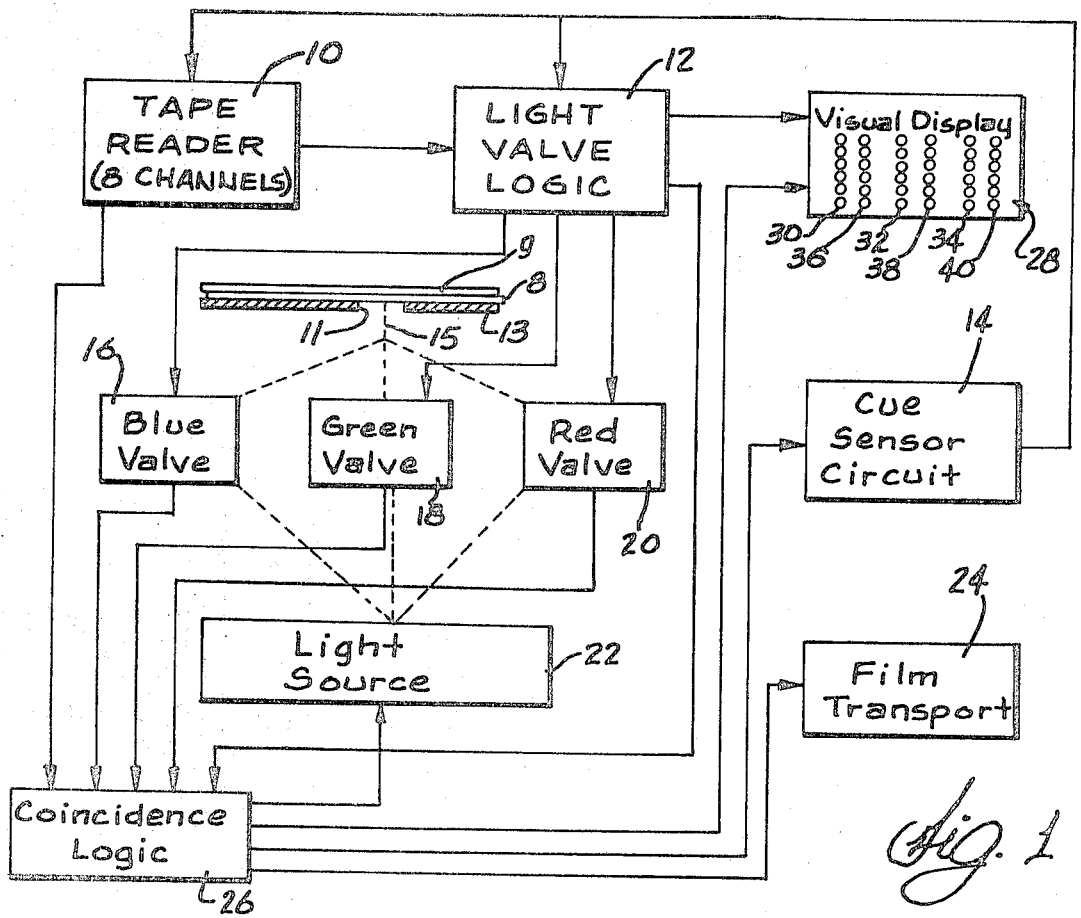
FIG. 1 is a block diagram of one embodiment of the invention.

Referring now to the drawings and more particularly to FIG. 1, the system which is fully described in the Printer Application is represented in block diagram form. The original film 8 and the raw film 9 pass over an aperture 11 in a light housing 13 where light 15 impinges on the raw stock 9 through the original 8. The light indicated by broken line 15 is an additive combination of red, blue, and green light. The tape reader 10 senses the holes in a punched tape and feeds binary light information to the light valve logic system 12 where the information is processed. At an appropriate time, the light valve logic system 12 is triggered by a cue sensor circuit 14 which also steps the tape reader 10. The information stored in the logic system 12 is mechanically transferred to the vanes of blue valve 16, green valve 18, and red valve 20 after which new light information is read by the tape reader 10 and transferred to the logic system 12 for the subsequent scene. The valves used in the preferred embodiment are conventional devices manufactured by Bell & Howell Company, and they include a pair of rotatable doors movable from a fully closed or zero cut position to a wide open position in fifty-one increments. The increments are determined by the holes in six of the eight channels of the tape which is sensed by tape reader 10, the remaining two holes being for control purposes not relevant here.

A light source 22 which provides substantially white light includes a dichroic system for separating the light into blue, green, and red components. These components respectively pass through the blue, green, and red valves after which they are recombined and applied through the original 8 to the raw film 9.

The system includes a film transport 24 which drives both take-up and supply reels as well as the various sprockets necessary for uniform and orderly film transit. In addition to the foregoing portions of the apparatus of this invention which are described in greater detail in the Printer Application, the instant invention includes a system for detecting anomalies in light valve operation and to actuate various control mechanisms in the event of an anomaly. The system includes a coincidence logic circuit 26 which compares information from the tape reader 10 with information from the three light valves 16, 18, and 20. In response to this comparison, control signals are applied from coincidence logic circuit 26 to the light source 22, the cue sensor circuit 14, and the film transport mechanism 24. In the event of an anomaly, the light source 22 is placed in standby and film transport 24 is immediately de-energized. Furthermore, communication from the cue sensor circuit 14 to the tape reader 10 and light valve logic system 12 are opened to prevent further actuation of either of these elements, and thus preserve the anomaly for maintenance purposes.

In addition to the foregoing protective devices, a visual display 28 is provided to indicate the precise location of the anomaly. The visual display comprises three vertical columns of six lights each, the vertical column 30 representing the operation of the six plungers in red valve 20, the column 32 representing operation of the six plungers in green valve 18, and the vertical column 34 representing operation of the six plungers in blue valve 16. Lights may also be included for the seventh and eighth channels which may check a fader circuit or the like. As the tape is read, any plunger which is actuated to exclude light will open the display circuit and de-energize the appropriate light. This display will persist until the next cue cycle begins.

In side-by-side relationship with the respective valve light displays 30, 32, and 34 are three similar columns of lights, column 36 representing the punched holes in the tape which represent red information, column 38 representing the punched holes with respect to green information, and column 40 representing punched holes with respect to blue information. These lights will be normally illuminated at the beginning of a cue cycle and will be de-energized by the tape reader 10 at substantially the same instant that the corresponding lights in the valve displays 30, 32, and 34 are de-energized (assuming no anomaly).

The manner in which the system operates is generally as follows: The operator depresses a starting button which energizes the film transport system 24 and generates a synthetic cue to actuate the tape reader 10. The tape reader immediately places red, green, and blue information into the light valve logic system 12 and the raw film 9 and original 8 begin to pass through the printer. A notch, magnetic patch, or similar cue effect is disposed on the original film 8, and as the film moves through the printer bringing the first scene under aperture 11, the cue is sensed by cue sensor circuit 14 which actuates tape reader 10 through a cycle transferring the previously stored information to the three light vanes 16, 18, and 20 and, at the same time, unlatching or clearing the plungers and transferring new information into the light valve logic system 12.

For each change in scene or for each desired change in the lighting effect during a given scene, a new cue is sensed causing the tape reader to transfer the previously stored information to the light vanes and, in turn, provide new light information to the logic system 12. This may occur hundreds of times during one motion picture copying operation and at a rate up to several times a second. If the system malfunctions at any point during the copying operation, the entire film may be useless, and thus detection of anomalies between the program data and actual operation is of substantial importance.

In general, the standards for production films permit only one splice in any complete film, and, thus, if a single scene were mislighted because of a system failure, almost the entire film might be useless. Therefore, in accordance with this invention, an immediate comparison is made each time there is a scene change to be certain that the settings of the logic system 12, and consequently the light valves 16, 18, and 20, correspond to the punched data in the tape which have passed through the tape reader 10. The manner in which this system operates will be obvious from the description of the additional figures.

Figure 2:
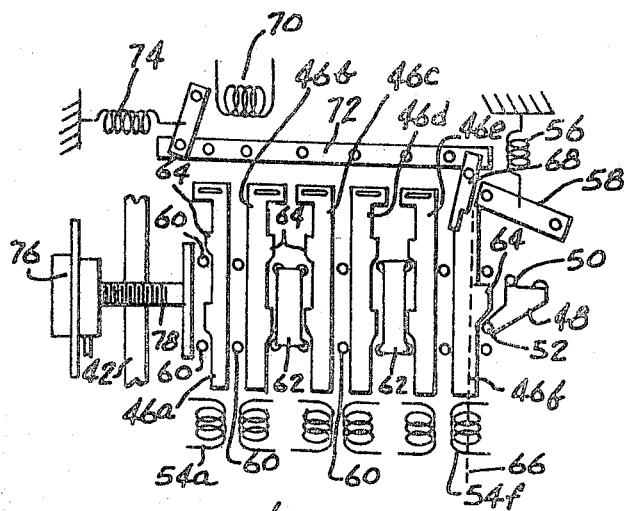
FIG. 2 is a diagrammatic illustration of the memory or plunger portion of one light valve.

One of the light valves is illustrated in FIGS. 2 and 3. The three are substantially identical and will not be described individually.

A set of plungers 46a–f are movable in the housing 42 in such a manner that they alter a bell crank 48 which can be coupled to a pair of light vanes disposed in the vane support 44.

The manner in which the individual light valves 16, 18, and 20 are modulated can be generally understood from FIG. 2. The bell crank 48 is pivoted about point 50 and the displacement of the ball 52 determines the degree to which the vanes of the light valve are to be closed. Thus, the displacement of the ball 52 about the axis 50 is an inverse indication of the amount of light desired on the film in accordance with the information stored on the tape. The conversion of the binary tape information into this rotary displacement is accomplished by the electromechanical system of FIG. 2 which is mounted in a housing in a conventional manner. The particular system disclosed in FIGS. 2 and 3 is a part of a commercially available light valve manufactured by Bell & Howell Company.

The bell crank 48 is displaced in response to pressure on a follower 52 which is moved in a counterclockwise direction whenever any one of the interference bars or plungers 46a–46f is actuated. The six sensors in the tape reader 10 are effective to actuate six coils 54a–54f at a predetermined time in the tape reader cycle in the event that a given sensor reads a no-hole condition in the tape. Each of these coils 54a–54f, when actuated, operates against a spring 56 through an arm, only arm 58 being shown connected to coil 54f by broken line 66, to draw the respective interference plungers 46a–46f outwardly. Because of the axially aligned rigid arrangement of the interference bars and intermediate rollers 60 and roller assemblies 62, outward motion of any or all of the interference bars produces proportional transverse movement of all of the plungers and counterclockwise rotary motion of bell crank 48. The ramps 64 on the interference plungers 46a–46f are of varying dimensions as is clear from the drawings. The dimensions of the ramps 64 vary from a unit light value of one on interference plunger 46a through a value of twenty on interference plunger 46f. The light values, respectively, are one, two, four, eight, sixteen, and twenty. By providing energization of various combinations of the six coils 54a–54f, fifty-one unique and incremental positions are defined for bell crank 48.

Arm 58 is urged upwardly by spring 56 and drives the interference plunger 46f downwardly through a pin and slot arrangement when solenoid 54f is energized. When actuated, arm 58 is engaged by latch 68, and the latch maintains the interference plunger in the extended position. At the beginning of a subsequent reading cycle the "unlatch" solenoid 70 is energized, moving rod 72 to the right in FIG. 2 against spring 74 to pivot the latches such as latch 68 and release all of the interference plungers 46a–46f.

In addition to the digital control, the trimmer knob 76 is secured to shaft 78 which is threaded in the light valve frame 42 whereby rotation of knob 76 causes the entire assembly of interference plungers 46a–f to be urged axially to trim the light value for each of the digital positions. As shown in FIG. 3, the plungers 46a–f are movable both axially out of housing 42 and also transversely in slot 80.

In order to check proper operation of the light valve, each of the plungers is in engagement with a switch spring 90–100 which controls respective snap-action switches 102–112. The switches are normally closed when the respective plungers 46a–f are retracted into the housing 42, and as each plunger is actuated by the respective solenoids 54a–f, the corresponding switch 102–112 is opened. An open plunger switch indicates that the respective plunger is extended and the light valve logic has been programmed to shift the vanes toward the changed position at the next cue in an amount directly related to the binary valve of the particular plunger.

The switches 102–112 are disposed within the mechanical confines of the valve housing 42 so that the coincidence system of this invention may be incorporated in existing film copying equipment without substantial modification of the optical system. This was accomplished in the instant invention by attaching an adapter plate 114 to a recessed face 116 of the light valve with each of the switches 102–112 inwardly disposed with respect to a plane defined by the end plates 118 and 120 of the housing 42. Each switch 102–112 is supported on the adapter plate 114 by a rotatably mounted trunnion plate 121a–f which is held in mounting blocks 122a–f.

The particular arrangement is more clearly illustrated in FIGS. 4 and 5 where the mounting block 122 is shown bolted to the adapter plate 114 with the trunnion 121 having a support face 124 to which the switch 102 is secured by bolts 125. The switch is a commercially available snap-action device having a movable central pole connected to terminal 126, a normally open terminal 128, and normally closed terminal 130. The central and N.C. terminals 126 and 130 are connected to the coincidence circuit through conductors 131.

The switch 102 is actuated by a lever arm 132 pivotally mounted on pin 134 and in engagement with a spring pivot 136. The spring 90 is preferably secured, as by the bolt 138, to the pivot 136 forming an integral assembly having a rigid camming surface 140 in engagement with the switch lever arm 132 and a yieldable extension 142 which is in engagement with the respective plunger.

As shown in FIG. 4, the pivots 136a–f are supported in slots 135 in the adapter 114, only switch 102 being shown in position for illustrative purposes. The pivot 136a is rotatable on a pin 137 which is secured to the adapter 114 by bolts 139, and the pin 137 is precisely located by the channel 141 formed in the adapter 114. The adapter 114 is maintained in position on the housing 42 by bolts 143, and the mounting blocks 122 are bolted in position on the adapter plate 114 over the clearance apertures 145.

The trunnion 121 is locked by a set screw 147 whereby the supporting plate 124 can be adjusted in the mounting block 122 to provide proper switch actuation while still providing the required clearances.

Figure 6:
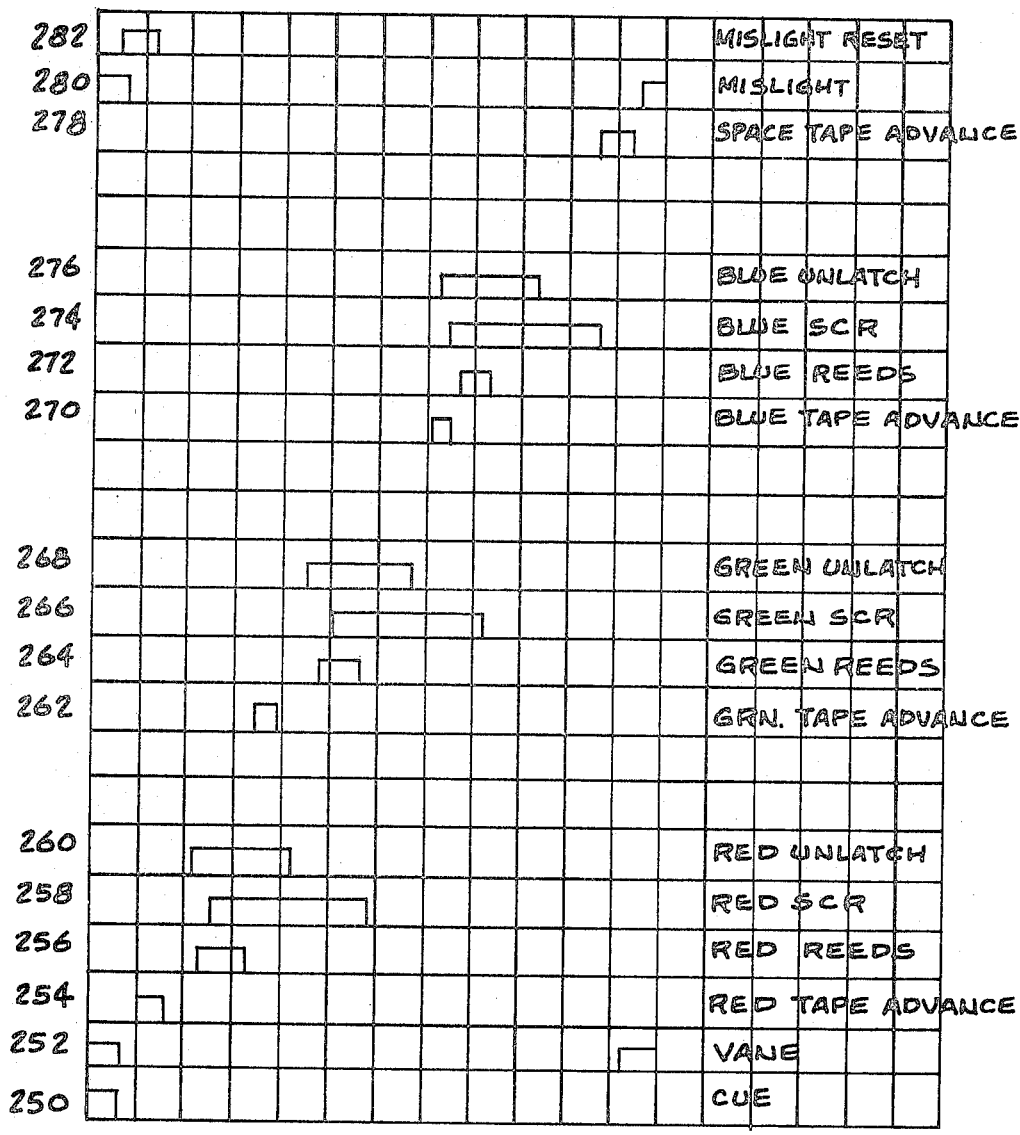
FIG. 6 is a timing chart representing the operation of the described embodiment.

FIG. 6 illustrates the timing of the system for putting the light data into the valves and for checking anomalies and preventing erroneous lighting conditions. It should be understood that the entire cue cycle lasts only a fraction of a second and a given set of data may remain in the valves for many seconds or even minutes. The cue sensor 14 provides a cue during the first few degrees of rotation of the cam mechanism, as shown in row 250, and this cue initiates operation of the tape reader 10 and the light valve logic system 12, as shown in FIG. 1. Upon initiation of a cue from sensor circuit 14, the information previously stored in the light valve logic system 12 in the form of plunger positions is transferred to the light vanes as shown in the timing row 252, second from the bottom of the timing chart. The cam sequence proceeds automatically, closing a switch at the time indicated in row 254 which shifts the tape reader 10 to read the red information in the first scene so that this red information can be sensed by a plurality of reader switches 146a–f which will be described with respect to FIG. 7.

Continued rotation of the cam closes a switch as shown in row 256 which applies voltage to the red reed relays and, wherever a hole exists in the punched tape, the relays will be de-energized. The relays, when energized, will fire an SCR at the time indicated in row 258 which controls the red logic memory as appropriate. A red unlatch relay is also energized as shown in row 260 at about the same time as the reed relay and SCR but is de-energized while the SCR is conducting.

An identical sequence is followed with respect to the green and blue information as shown in rows 262–276.

Following the similar operation of the green and blue tape advance, a further cam-operated switch provides a tape advance to move the tape to a blank space between scenes as shown in timing row 278. The tape rests in this position while the cam mechanism completes its cycle closing an anomaly or mislight check switch 192 during the period of time represented by row 280. Following the anomaly check, a further cam switch 170 closes initiating an anomaly check or mislight reset at the beginning of the next cuing cycle as shown in the top row 282 of the timing chart of FIG. 6.

The circuit which accomplishes the foregoing operation and anomaly checking is shown diagrammatically in FIG. 7. As already described, the tape includes six light information channels which are based upon a binary code providing fifty-one different light settings. In FIG. 7 the coded channels are marked 1, 2, 4, 8, 16, and 20, representing the binary values assigned to each channel. Movable contacts 144a–f are associated with the six data channels and, through a mechanical linkage, the contacts effectively rest upon the tape so that when a hole is sensed in one of the channels, the respective contact 144a–f moves from the position shown in FIG. 7 to a lower position in engagement with the data contacts 146a–f. The contacts 146a–f are connected directly to the light valve logic 12 of FIG. 1 and determine the settings of the light valve plungers 46a–f in a manner which will not be described in this specification.

Associated with each movable contact 144a–f is a back contact 148a–f which is normally connected to ground 150 through the movable contacts 144a–f. The back contacts 148a–f are utilized to check for an anomaly anywhere in the system. Normal operation will produce an open circuit at the back contacts 148a–f whenever the data contacts 146a–f are closed by virtue of a hole in the respective channels.

Thus, when a hole is sensed in any channel, the logic circuit associated with the respective contacts 146a–f and the particular color indicated by the cam timing chart, FIG. 6, is actuated. The presence of a hole will, during any given cycle, prevent actuation of the respective plunger in the light valves 16, 18, or 20, providing increased light by virtue thereof. Under this condition, the appropriate normally closed switch 102–112 secured to the light valve will indicate an "on" condition and remain closed.

To check the operation of the system, this switch from the set 102–112 is compared with the back contacts 148 in the coincidence circuit shown in FIG. 7. The data from switches 148a–f is processed in amplifiers 151a–f which, in turn, control latching relays 168a–f during the red cycle, relays 168g–l during the green cycle, and relays 168m–r during the blue cycle when running in the normal backward direction.

Contacts in the latching relays 168a–r energize the respective lamps in rows 36–40 of visual display 28 and also complete a circuit in the comparator circuits 180a–r. The plunger switches 102–112 in the three light valves are also disposed in the respective comparator circuits 180a–r and the output of those circuits is applied to a read-out circuit 199. The read-out circuit, in turn, controls a holding circuit 201 which, in turn, controls various printer functions.

Describing the foregoing in greater detail, the amplifiers 151a–f each include transistor 152 biased for conduction by the resistor network including resistor 154 connected to a negative supply, resistor 156, and resistor 158 connected to a positive supply. The base of transistor 152 is normally connected to the negative voltage source through resistor 154 and, as the emitter is connected to ground 150, the transistor 152 is in an "on" condition. In the event that a hole is sensed by movable contact 144a, the connection between resistor 156 and ground 150 is opened, placing a positive voltage on the base of transistor 152 through resistors 156 and 158. This positive bias voltage renders the transistor 152 nonconductive or turns it "off." The condition of the transistor is periodically sampled by cam contacts 160, the timing of which is illustrated collectively by rows 256, 264, and 272 in FIG. 6 as will be explained in greater detail.

The outputs of amplifiers 151a–f provide tape reader information to latching relays 168a–r. The relays 168a–r are all actuated to the latched position where contacts 166 are held closed when, at the beginning of a cuing cycle, the cam switch 170 is closed, as shown in row 280 of FIG. 6. Closure of contacts 170 energizes latching coils 172 which are protected by diodes 178 from B+ supply 174 to ground 150 so that all lights 186 in the columns 36, 38, and 40 of visual display 28 are energized.

Thereafter, cam contacts 160, 220, and 222 are sequentially closed in accordance with rows 256, 264, and 272 respectively of FIG. 6, and with contacts 162 and 228 closed, the cam contacts apply the output of amplifiers 151a–f sequentially to the unlatching coils 164 of relays 168a–f for the red data, relays 168g–l for the green data, and relays 168m–r for the blue data. Each coil is protected by a diode 176 and is actuated only in the event that the respective back contacts 148 remain closed indicating a no-hole or zero condition in that data channel. As the cam contacts close, the appropriate lights in columns 36, 38, and 40 are sequentially de-energized.

Diagrammatically shown in the comparator circuit 180 is the plunger switch 102R illustrated in an open position. There are, of course, a total of eighteen plunger switches 102–112 in the three light valves. The open position is the position which switch 102 assumes whenever the plunger is extended, and thus, the valve registers a "no-hole" or "no-light" condition. The light 182 in column 30 is thus de-energized. At the same time, if a no-hole condition is sensed by the movable contact 144a, the latching coil 164 opens the contact 166 and the circuit from positive voltage terminal 184 through contact 166, lamp 186 in column 36, resistor 188, and ground bus 190 is opened. The generation of this visual display occurs very quickly during the single rotation of the cam mechanism diagrammed in FIG. 6, and is then maintained until the next cue pulse is received.

The comparators 180a–r are adaptations of a conventional "exclusive or" logic circuit. Transistors 284 and 286 have emitters grounded at terminal 190 and collectors connected together through diodes 288 and 290 to a common output 294. The collectors are connected to ground through a 15K ohm resistor 292. The base of transistor 284 is connected through 47K ohm resistor 296 to the junction of contacts 166 and lamp 186 whereby B+ voltage is applied to the base whenever the contacts 166 are closed indicating a hole or "on" condition. Similarly, when the plunger contact 102R is closed, B+ voltage is applied to lamp 182 through resistor 181 and this is in turn applied to the base of transistor 286 through 47K ohm resistor 287.

The B+ signal from hole-sensing contacts 166 is applied directly to output diode 290 through 1K ohm resistor 291 while the B+ signal from plunger switch 102R is applied directly to the output diode 288 through a 1K ohm resistor 289.

If switch 102R is closed when contacts 166 are not, B+ is applied through resistor 289, and diodes 288 and 294 to the control circuit 199. Also, if contacts 166 are closed and switch 102R is not, B+ will be applied through resistor 291 and diodes 290 and 294 to the control circuit 199. However, if both switch 102R and contacts 166 are open, there is no output, and conversely, if both are closed, transistors 284 and 286 are conductive, and substantially the entire voltage drop appears across the 1K ohm resistors 289 and 291.

At the end of the cuing cycle, the cam contact 192 is momentarily closed as shown in timing row 280 applying collector voltage to a transistor 194 in the control circuit 199. If at the time that cam 192 is closed at the end of a cam cycle, the comparator 180 indicates a difference between the conditions of switches 102R and 166, a positive voltage is applied through conductor 198 rendering transistor 194 conductive and energizing the coil of stop relay 200. Energization of relay 200 closes normally open contacts 202 to energize a holding relay 204.

Energization of relay 204 closes holding contacts 206 whereby the reopening of the cam contacts 192 will not affect the energization of winding 204. The system is reset only by breaking the holding circuit by depressing push button 207. Energization of winding 204 closes contacts 208 illuminating lamp 210 which immediately indicates to maintenance personnel that there has been a malfunction of the equipment. At the same time, normally closed contacts 212 are opened preventing the notch sensing switch 14 from generating the cue pulses in the cue source 216. Also controlled by winding 204 are contacts 218 which are normally closed and connected to the film transport system 24. Thus, once winding 204 is enegized, further operation of the film transport is prevented Finally, normally closed contacts 219 open the circuit to light source 22 to reduce the voltage to standby.

The anomaly checking circuit has been described only with respect to the plunger and information channel in the "1" position as it is applied to the red light valve. The remainder of the system is substantially the same as that described and is therefore shown in block form. There are six latching relays 168 and comparators 180 associated with each of the light valves 16, 18, and 20, for a total of eighteen as diagrammatically shown in FIG. 7. If any one of the comparators senses an anomaly because of a disagreement between its back contacts 148 and the plunger switch 102-112, the transistor 194 is rendered conductive in the control circuit 199, and operation of the equipment is terminated. Any one of the anomalies will energize the same maintenance light 210, but for each anomaly, a different visual effect will appear on the display 28. If a single plunger has malfunctioned, all of the lights in the visual display 28 will be in agreement with the exception of one. This one will identify the particular plunger and data channel in the particular color section which malfunctioned.

One further significant circuit shown in FIG. 7 includes the cam contacts 160, normally in the red section and contacts 222 normally in the blue channel in backward operation. Irrespective of the direction of operation of the system, the green or intermediate channel contacts 220 remain the same. However, for backward operation the contacts 162 and 228 are closed as already described so that the cam contacts 160 control the first set of latching relays 168a–f. Similarly, contacts 228 apply the cam contacts 222 to the latching relays 168m–r corresponding to the blue channel.

For reverse operation (the forward direction) contacts 162 and 228 are opened while contacts 226 and 224 are closed. This merely applies the cam contacts 222 to the red channel while applying the cam contacts 160 to the blue channel to accommodate the reverse sequence of tape information when the tape and film printer are being run in the reverse or forward direction.

As will be clear from the foregoing, a system is hereby provided which will result in substantial economy in the production of multiple copies of motion picture films. Moreover, the equipment automatically preserves any anomaly in printer operation by sensing that anomaly and preventing any further cuing of the sytem which might result in a loss of all information concerning the source of the problem.

Furthermore, the system automatically stops the printer by de-energizing the light source and film transport in a simple and efficient manner.

Without further elaboration, the foregoing will so fully explain the character of the invention that others may, by applying current knowledge, readily adapt the same for use under varying conditions of service, while retaining certain features which may properly be said to constitute the essential items of novelty involved, which items are intended to be defined and secured by the following claims.

What is claimed is:

1. In film copying equipment for producing copies on raw film from an original, the film copying equipment including a film support defining an aperture, a light source projecting light through said aperture, variable means disposed between said light source and said aperture for controlling the light passing through said aperture, and control means sequentially to indicate a desired light condition and to adjust said variable means in accordance with a predetermined program; the improvement comprising means responsive to the adjustment of said variable means at any given time, and generating a signal representative thereof, means responsive to the control means at said given time and generating a signal representative thereof, and comparator means indicating the coordination of said desired light condition and the adjustment of said variable means by comparing said signals, said comparator means including means to alter the operation of said equipment whenever the output of said control means is not in correspondence with the adjustment of said variable means.

2. The film copying equipment of claim 1 including means for copying film in color, said variable means adjusting a plurality of color components, said control means providing individual indications and control for each of said color components, and said comparator means indicating the coordination of each of said indications with the adjustment of said variable means for each of said color components.

3. The film copying equipment of claim 1 wherein a plurality of cue effects are disposed along said original, each indicating the positions along said original where a change in said light is desired, said cue effects causing said variable means to change to a new adjustment in accordance with the indications from said control means.

4. The film copying equipment of claim 3 including stop means to terminate the operation of said equipment whenever the output of said control means is not in correspondence with the adjustment of said variable means, and means to prevent any additional cue effects from causing said variable means to change to a new adjustment after said comparator means indicates a failure of coordination.

5. The film copying equipment of claim 4 including motor drive means for said equipment, said stop means deenergizing said motor drive means whenever the output of said control means is not in correspondence with the adjustment of said variable means.

6. The film copying equipment of claim 2 wherein the control means includes a predetermined sequence of color data on an elongate tape with color information for each of said color components being disposed along a transverse line and said lines being in groups corresponding to each color change, said color information being transferred to said storage portion sequentially and transferred from said storage position to the variable means coincidentally.

7. The film copying equipment of claim 6 wherein the comparator means sequentially compares the information placed in the storage portion with the color information in each transverse line.

8. The film copying equipment of claim 11 wherein said storage portion includes a plurality of movable elements, each representing a predetermined amount of light, and said variable means includes a shiftable cam means which engages said movable elements and is shifted in accordance with the positions thereof, and means defining a variable aperture coupled to said cam means, said comparator means including a plurality of switches, one associated with each of said movable elements whereby the information stored in said movable elements can be compared with the desired light condition.

9. The film copying equipment of claim 8 wherein said movable elements are a plurality of parallel plungers in axially sliding engagement with one another, each of said plungers having a cam surface in engagement with an adjacent plunger, said plungers being transversely movable in response to axial movement of an adjacent plunger, the total transverse movement at one end thereof corresponding to the number of plungers moved and said one end drivingly engaging said cam means periodically to adjust said variable aperture means, said switches being in engagement with said plungers, there being a separate channel in said control means corresponding to each of said plungers, and said comparator means comparing the information in each channel with the position of the corresponding switch.

10. The film copying equipment of claim 9 wherein said control means includes an elongate punched tape with light information in a plurality of transverse rows of holes therein, said holes being arranged in longitudinal channels, each corresponding to a predetermined amount of light and corresponding to one of said plungers, feeler means to sense the presence of a hole in a particular channel and close an electrical circuit which is a portion of said control means, and normally closed switch contacts associated with each of said feeler means to indicate a hole in that channel, said normally open contacts comprising the means responsive to the control means.

11. The film copying equipment of claim 1 wherein said variable means includes a light information storage portion and said predetermined program is stored in said storage means.

12. In film copying equipment for producing copies on raw color film from a color original, the film copying equipment including a film support defining an aperture, a light source projecting light through said aperture, said light source having red, green and blue components traveling separated paths, a variable aperture light valve in each of said paths, each of said valves including a plurality of binary coded plungers coupled in an additive relationship and movable from actuated to unactuated position and clutch means to transfer the sum of the actuated plungers to the variable aperture, and a punched tape system to control said plungers, each transverse row of holes representing one of said colors, said rows being in groups representing a color change, and said holes being arranged in channels, each channel representing one of said plungers, and cue effects on said original to actuate said tape system, the improvement comprising a switch associated with each of said plungers and actuated thereby, a switch associated with each channel and actuated whenever a hole appears in that channel, a comparator circuit which comprises the actuation of said switches and stops said equipment if they are not in agreement, visual means to indicate which of said channels has actuated said comparator circuit, and means to prevent said cue effects from actuating said tape system whenever said comparator circuit is actuated.

13. In film copying equipment for producing copies on raw film from an original, the film copying equipment including a film support defining an aperture, a light source projecting light through said aperture, variable means disposed between said light source and said aperture for controlling the light passing through said aperture, said variable means comprising a housing, variable aperture means movably mounted in said housing, a plurality of plungers longitudinally movable in said housing, each plunger having a transverse cam portion, the transverse extension of which represents a predetermined adjustment of said variable aperture, said plungers being transversely slidable whereby one end thereof moves transversely a distance directly related to the amount of light represented by the actuated plungers at any given time, clutch means to transfer the transverse displacement of said one end to said aperture means, and control means sequentially to indicate a desired light condition and to adjust said plungers in accordance with a predetermined program: the improvement comprising switch means adjacent each of said plungers and actuated thereby irrespective of the transverse positions thereof, and generating a signal representative of the position thereof, means responsive to the control means at said given time and generating a signal representative thereof, and comparator means including means to alter the operation of said equipment whenever the output of said control means is not in correspondence with the adjustment of said plungers.

References Cited

UNITED STATES PATENTS

| | | | |
|---|---|---|---|
| 2,943,554 | 7/1960 | Kästner | 355—88 |
| 3,060,790 | 10/1962 | Ward | 356—176 |
| 3,418,048 | 12/1968 | Veit | 355—38 |
| 3,458,256 | 7/1969 | Stemke | 355—88 |

JOHN M. HORAN, Primary Examiner

M. HARRIS, Assistant Examiner

U.S. Cl. X.R.

355—69, 71, 88; 356—176, 177

UNITED STATES PATENT OFFICE
CERTIFICATE OF CORRECTION

Patent No. 3,552,852                    Dated January 5, 1971

Inventor(s) Henry F. Stemke and William W. Morris

It is certified that error appears in the above-identified patent and that said Letters Patent are hereby corrected as shown below:

Column 1, lines 24-25, delete "for detecting any anomalies in the film copying equipment,"

Column 1, line 66, "value" should be -- valve --.

Column 2, line 5, "values" should be -- valves --.

Column 2, line 10, "value" should be -- valve --.

Column 2, line 13, delete "the" before "three".

Column 3, line 70, "anomally" should be -- anomaly --.

Column 5, line 38, "the" (first occurrence) should be -- this --.

Column 5, line 55, "valve" should be -- value --.

Column 8, line 72, "enegized" should be -- energized --.

Column 11, claim 12, line 21 of the claim, "comprises" should be -- compares --.

Signed and sealed this 1st day of June 1971.

(SEAL)
Attest:

EDWARD M. FLETCHER, JR.
Attesting Officer

WILLIAM E. SCHUYLER, JR.
Commissioner of Patents